(12) United States Patent
Bacim De Araujo E Silva et al.

(10) Patent No.: US 11,748,918 B1
(45) Date of Patent: Sep. 5, 2023

(54) SYNTHESIZED CAMERA ARRAYS FOR RENDERING NOVEL VIEWPOINTS

(71) Applicant: Apple Inc., Cupertino, CA (US)

(72) Inventors: Felipe Bacim De Araujo E Silva, San Jose, CA (US); Dan C Lelescu, Morgan Hill, CA (US); Sebastien Eric Gilles Leprince, San Mateo, CA (US); Gary L Vondran, Jr., San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,703

(22) Filed: Sep. 23, 2021

Related U.S. Application Data (60) Provisional application No. 63/083,789, filed on Sep. 25, 2020.

(51) Int. Cl.
  *G06T 11/00* (2006.01)
  *G06T 7/55* (2017.01)
  *G06T 3/00* (2006.01)

(52) U.S. Cl.
  CPC ............. *G06T 11/00* (2013.01); *G06T 3/00* (2013.01); *G06T 7/55* (2017.01); *G06T 2207/20212* (2013.01)

(58) Field of Classification Search
  CPC .................................................. G06T 11/00
  See application file for complete search history.

(56) References Cited

U.S. PATENT DOCUMENTS

| 3,106,924 | A1 | 1/2012 | Aliprandi et al. |
| 10,009,550 | B1 | 6/2018 | Hunt |
| 10,951,879 | B2 | 3/2021 | Besley |
| 2013/0321396 | A1* | 12/2013 | Kirk .................... G06T 15/08 345/419 |
| 2016/0330432 | A1* | 11/2016 | Yu ....................... H04N 13/128 |

OTHER PUBLICATIONS

C. L. Zitnick, et al., "High-Quality Video View Interpolation Using a Layered Representation", ACM SIGGRAPH and ACM Trans. on Graphics, Los Angeles, Calif., USA, Aug. 2004, pp. 1-9.

\* cited by examiner

*Primary Examiner* — Shivang I Patel
(74) *Attorney, Agent, or Firm* — S. Scott Foster; Kowert, Hood, Munyon, Rankin & Goetzel, P.C.

(57) ABSTRACT

Novel viewpoints may be rendered using arrays of camera images with synthesized viewpoints. Different viewpoints of a scene may be captured via image sensors. Depth information may be determined for the captured viewpoints. An array of images may be generated that includes synthetic viewpoints generated from the captured viewpoints and depth information. A request to render a novel viewpoint may be received. Then novel viewpoint may be rendered using the array of images with synthetic viewpoints.

20 Claims, 9 Drawing Sheets

SYNTHESIZED CAMERA ARRAYS FOR RENDERING NOVEL VIEWPOINTS

This application claims benefit of priority to U.S. Provisional Application Ser. No. 63/083,789, entitled "Synthesized Camera Arrays for Rendering Novel Viewpoints," filed Sep. 25, 2020, and which is hereby incorporated herein by reference in its entirety.

BACKGROUND

Computer vision techniques allow for captured image data to be transformed in different ways to provide differing views of a scene. Different viewpoints may, for example, be stitched together, in order to provide a viewer with an opportunity to view a larger portion of a scene or a different view within a scene than is initially provided by the originally captured image data. Such techniques may be used to share scenes captured in one location with viewers not present for the scene in order to give the non-present viewers the opportunity to experience the captured scene.

SUMMARY

Various embodiments of methods and apparatus for synthesized arrays for rendering novel viewpoints are described. Capture devices, such as head mounted displays or mobile computing devices, may capture various images of a scene using one or more image sensors. The captured images of the scene may be stored for later playback on the capture device, or shared with another device for playback. To provide novel viewpoint generation of the scene in real time, offline processing may be performed upon the captured images to generate an array of images. The array of images may, in various embodiments, be generated using the captured images as well as captured or estimated depth information to generate different synthetic viewpoints of the scene to include in the array of images.

In various embodiments, when a request for a novel viewpoint is received, the array of images may be used to generate the novel viewpoint. Neighboring images in the array of images may be identified according to the novel viewpoint and blended to render the novel viewpoint. The rendered novel viewpoint may then be displayed in response to the request, providing a real-time response to the request.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various techniques of synthesized camera arrays for rendering novel viewpoints are described. The quality and capacity of image sensors, such as various cameras implemented on mobile, handheld, wearable, or other devices, to capture scenes has enhanced the ability of users to share and re-experience these captured scenes. Various image-based rendering techniques, such as light field rendering, have allowed for scenes captured with sufficient information to be re-created from novel viewpoints of the scene, which were not captured by an image sensor. These novel viewpoints may be created while preserving many of the visual details or characteristics of the scene (e.g., specular features) that would be visible to a viewer that was present when the scene was captured. The computational resources to provide high-quality rendering of novel viewpoints, however, may constrain the deployment of capturing, rendering, and/or viewing novel viewpoints, to devices that are not easily portable or accessible (e.g., desktop computers as opposed to mobile computing devices).

Figure 1:
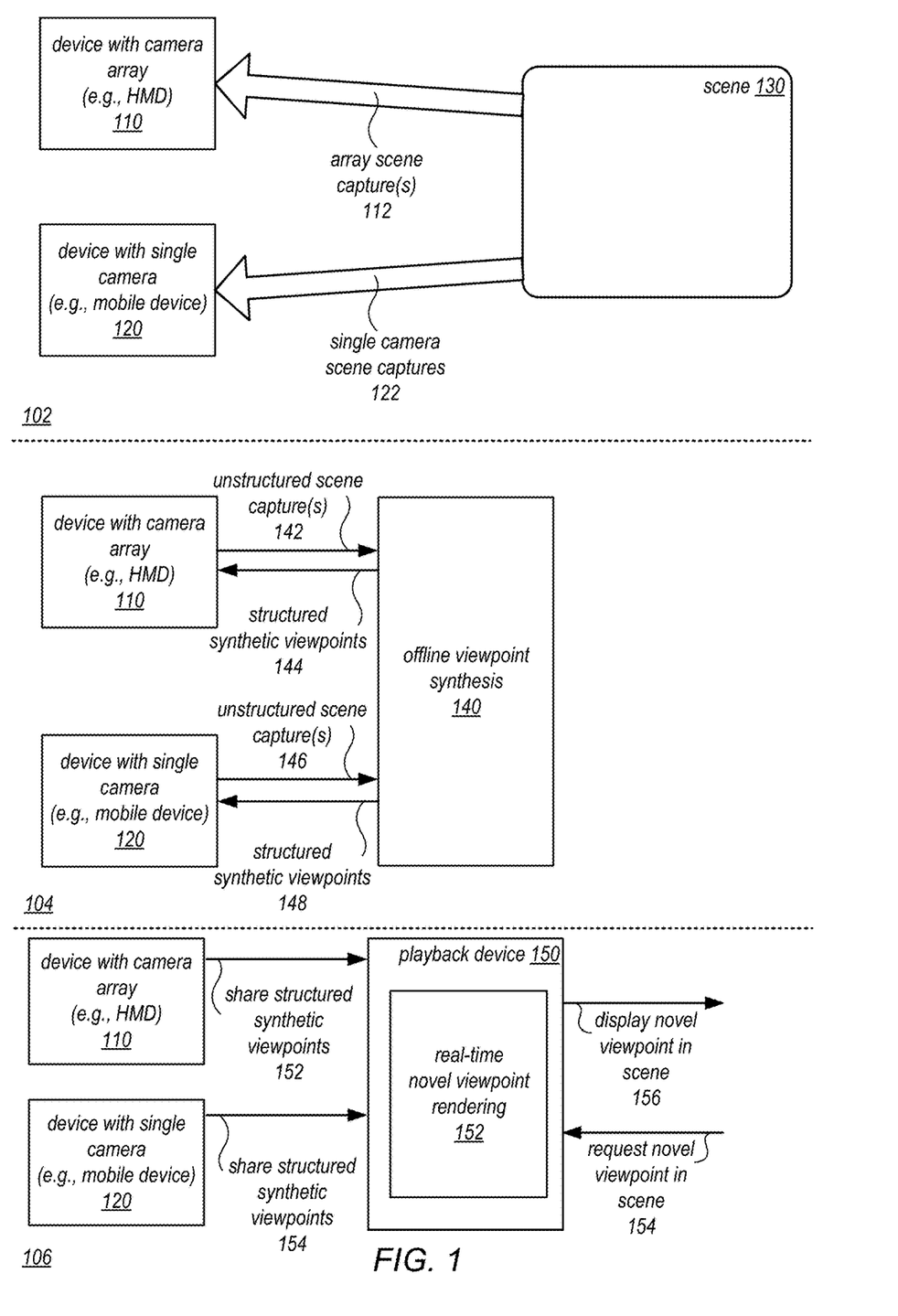
FIG. 1 illustrates logical block diagrams of synthesized camera arrays for rendering novel viewpoints, according to some embodiments.

In various embodiments, techniques of synthesized camera arrays for rendering novel viewpoints may be implemented to provide rendering of novel viewpoints of a scene in real time within the processing capabilities of devices with lower power or other processing constraints. In this way, captured scenes can be easily shared (or subsequently viewed) for playback, allowing for interactive selections of different viewpoints of the captured scene. FIG. 1 illustrates logical block diagrams of synthesized camera arrays for rendering novel viewpoints, according to some embodiments.

As indicated at 102, scene 130 may be visible to different types of devices, such as device with camera array 110 (e.g., like a head mounted display discussed below with regard to FIG. 8) of multiple cameras or a device with a single camera 120 (e.g., a mobile device discussed below with regard to FIG. 9). Scene 130 may be a scene of a physical environment, in some embodiments. Device with camera array 110 may make array scene captures 112, in some embodiments. For example, various cameras or other image sensors may capture color, depth, infrared, or other image representations of scene 130. A single capture of scene 130 for each camera in the array (e.g., six images from six mounted cameras) may be obtained or multiple captures from different cameras in the array may be obtained (e.g., in a burst capture mode, video capture mode, etc.). As each camera in the camera array may be located differently on device 110, each camera may provide a different field of view and other information about scene 130. For example, device 110 may have one (or multiple) main cameras that capture color image data (e.g., RGB) and one or multiple other machine vision cameras that capture color, depth, wide field-of-view of other types of image information from scene 130 according to their respective locations on device 110.

In another example, a device with a single camera 120 (e.g., a mobile device) may make multiple single camera scene captures 122 of scene 130. For example, multiple shots from different positions (e.g., in a burst mode) or a video from different positions camera may provide a different field of view and other information about scene 130.

As indicated at 104, offline viewpoint synthesis 140 may be implemented to perform offline processing of the captured scene information from device 110 and 120, in various embodiments. Offline viewpoint synthesis 140, as discussed in detail below with regard to FIGS. 2-7, may receive the various captures of scene 130 and transform them into structured synthetic viewpoints, as indicated at 144 and 148, which may be used to render novel viewpoints. For example, device 110 or device 120 may respectively provide unstructured scene captures 142 or 146 to another system or device that implements offline viewpoint synthesis 140, such as at a cloud-based service that handles requests and unstructured captured scenes received over a wired or wireless network connection and performs offline viewpoint synthesis. In some embodiments, offline viewpoint synthesis 140 may be implemented as part of the capture devices, such as device 110 or device 120 (e.g., utilizing dedicated hardware, such as an Image Signal Processor (ISP), Graphics Processing Unit (GPU), and/or Central Processing Unit (CPU) to perform various operations to generate structured synthetic viewpoints.

As indicated at 106, device 110 or device 120 may respectively share structured synthetic viewpoints 152 and 154 respectively with playback device 150. For example, playback device 150 may receive the structured scene captures with synthesized views through various electronic communication paths, such as through wired or wireless communications (e.g., via an Short Message Service (SMS) or Multimedia Message Service (MMS), electronic mail, as part of a video or other real-time communication, etc.). In some embodiments, structured synthetic viewpoints may be transmitted or stored according to a file or other data format optimized for sharing with playback device and/or efficient access for real-time novel viewpoint rendering 152.

Playback device 150 may, in some embodiments, implement an interface (e.g., a graphical user interface (GUI)) that accepts input or requests to specify a request for a novel viewpoint in a scene, as indicated at 154. For example, a touch-enabled device may allow a user to touch a screen using one or multiple gestures to navigate to or otherwise indicate a novel viewpoint. In some embodiments, playback device 150 may be a HMD or other device that provides a virtual reality system that may display stereoscopic scenes to users in order to create an illusion of depth. Such a playback device 150 may detect a movement of the user (e.g., wearer) to indicate a novel viewpoint in the scene to provide, providing the illusion of the user moving within the scene 130. Although not illustrated in FIG. 1, in some embodiments, the capture device (e.g., 110 or 120) may also be the playback device 150.

Figure 2:
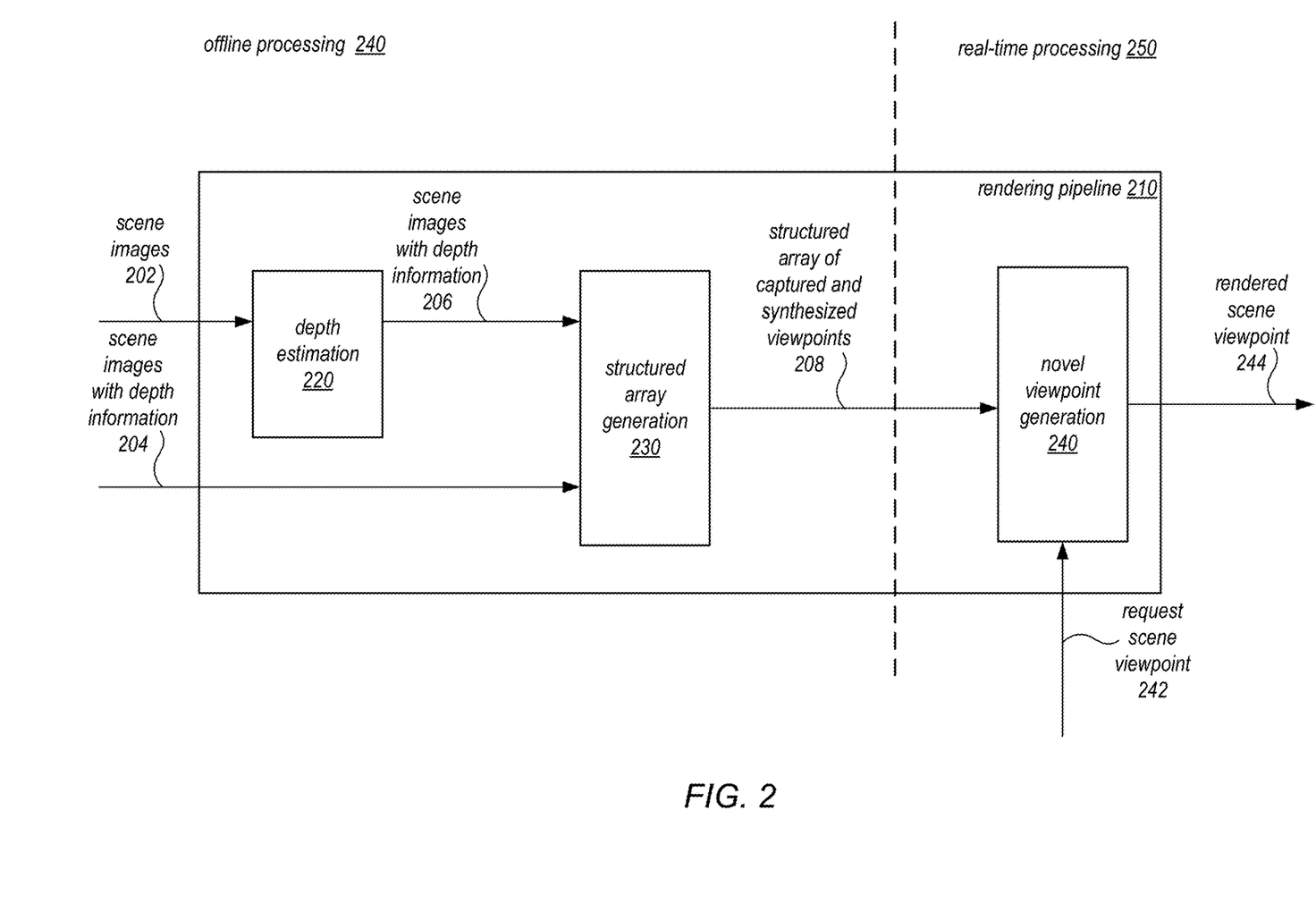
FIG. 2 illustrates an example rendering pipeline for synthesized camera arrays for rendering novel viewpoints, according to some embodiments.

FIG. 2 illustrates an example rendering pipeline for synthesized camera arrays for rendering novel viewpoints, according to some embodiments. Rendering pipeline 210 may include various stages that are performed to provide synthesized camera arrays for rendering novel viewpoints, in some embodiments. Rendering pipeline 210 may be divided into offline processing 240, which may be processing performed after receipt of scene images and performed, as discussed above in order to generate a structured array of captured and synthesized viewpoints, as indicated at 208. Offline processing 240 may be performed prior to a request for a novel viewpoint of a scene (e.g., as opposed to real-time processing 250 which may be performed after a request, such as request for a scene viewpoint as indicated at 242, in order to provide rendered scene viewpoint 244 in real-time). Offline processing 240 may be performed on a device that captured scene images or in a separate system that is sent the scene images.

In some embodiments, some images captured for a scene may not be as beneficial or usable for rendering a novel viewpoint. For example, a larger number of images may create large processing costs (and time) with little additional benefit for generating the structured array with synthesized viewpoints. Some images, therefore images may be selected up to some threshold amount, in some embodiments. Other received images that are not selected, may be excluded. For instance, images may be selected according to coverage of field of view, in some embodiments.

Different stages may be implemented in rendering pipeline 210 according to the received input data, in some embodiments. For example, some scene images may be received with depth information, as indicated at 204, which may be used as part of structured array generation 220. For scene images 202 without depth information, rendering pipeline 210 may implement depth estimation 220, in some embodiments, in order to provide scene images with depth information, as indicated at 206. FIGS. 3-15 discussed in detail below discuss techniques for implementing depth estimation for scene images.

Figure 3:
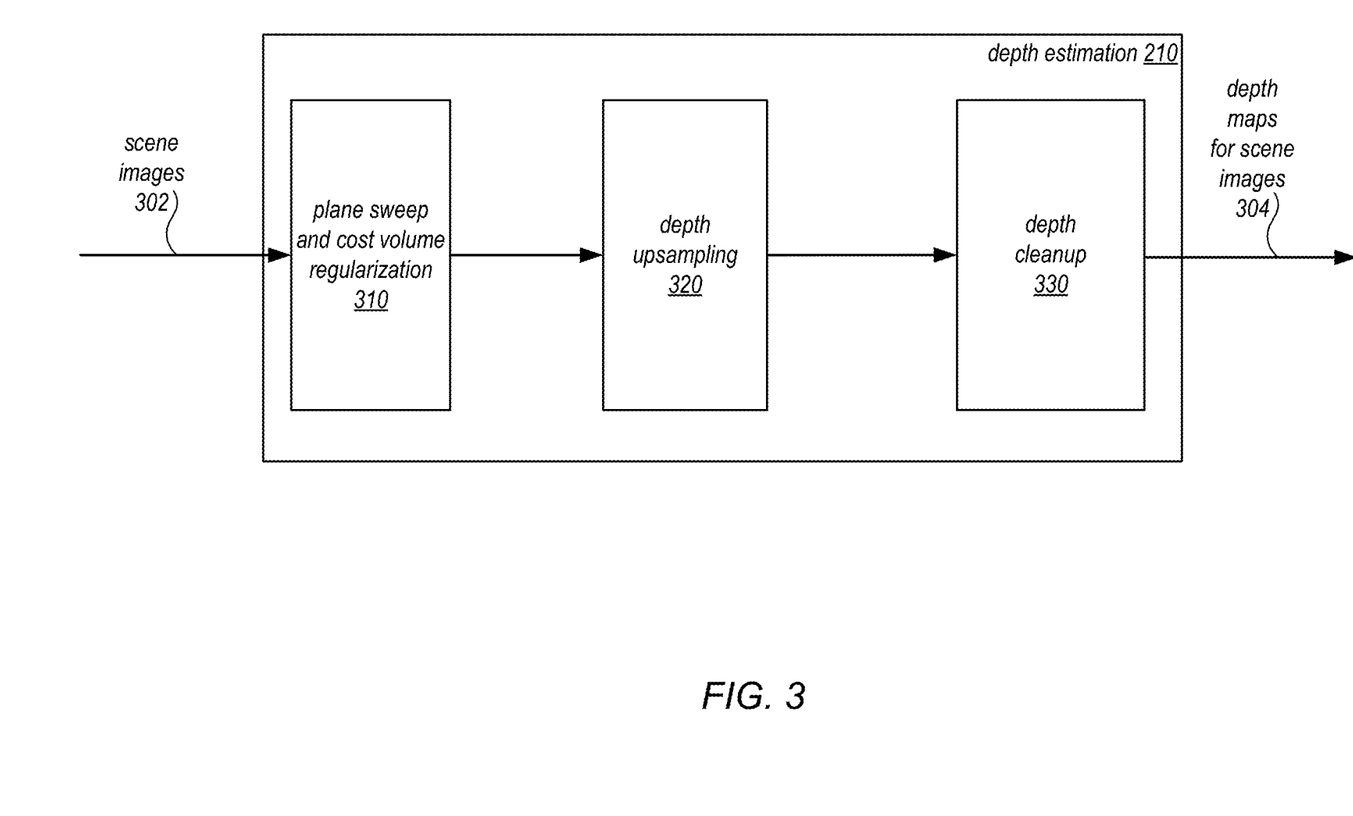
FIG. 3 illustrates a logical block diagram of depth estimation that may be implemented as part of a rendering pipeline, according to some embodiments.

FIG. 3 illustrates a logical block diagram of depth estimation that may be implemented as part of a rendering pipeline, according to some embodiments. Depth estimation 210 may implement plane sweep and cost volume regularization 310, in some embodiments. Depth estimation may also perform depth upsampling, as indicated at 320, and perform various operations to implement depth cleanup, as indicated 330, in some embodiments.

As indicated at 310, plane sweeping, such as frontoparallel plane sweeping technique, may be performed for received images. For example, images captured by secondary cameras (e.g., as opposed to a main camera), may be projected onto a sweeping plan perpendicular to a main camera view. Different plane sweeps may be performed at different depths, according to some embodiments. Different depth candidates and then for each depth candidate an aggregate may be computed according to a similarity measure determined from all projected images.

As indicated at 310, cost volume regularization may be performed for received images, in some embodiments. There may be a large number of depth labels, in some scenarios. In some embodiments, a one-dimensional optimization only may be implemented. In some embodiments, cost volumes may be augmented with other prior data (e.g., point cloud data, pairwise stereo data, etc.).

Depth cleanup 330 may be implemented as part of depth estimation 210, as indicated in FIG. 3, in order to provide depth maps for scene images 304. Depth maps, extracted according to plane sweep and cost volume regularization techniques discussed above, may be extracted independently, which may lead to scenarios where depth maps are not all consistent. In such scenarios, depth cleanup 330 may be multi-observation image guided depth denoising, iterated (e.g., twice). In some embodiments, depth cleanup 330 may include, successively for each depth map, projecting red green blue depth (RGBD) data onto a given depth map. A confidence of projected depths based on similarity between projected RBG and given RGB, in some embodiments. RGBD projection may be aware of image occlusions, as discussed below. In some embodiments, only best depths (e.g., 5 best depths) may be used according to weight (e.g., the highest weights). In some embodiments, a better estimate of a given depth may be based on multi-input denoising (e.g., using Huber-Huber norms). In some embodiments, depth cleanup 330 may use local variance of the given RBG to modulate regularization weights (e.g., regularize more in smooth area, less around edges).

In some embodiments, resampling may be performed as part of depth cleanup 330. FIG. 8B illustrates backward projection 820 and forward projection 810 for resampling, according to some embodiments.

In some embodiments, mapping of secondary views onto a main view may be performed as part of depth cleanup 330. For example, backward mapping or forward mapping may be performed, according to some embodiments. To perform mapping all pixels from a secondary image may be projected onto a main image using secondary depths, in some embodiments. Then, it may be determined which simplex given main view pixels belong to, in some embodiments. For each main view pixel, an affine fitting on a corresponding simplex may be used to approximate backward mapping. If a corresponding pixel has several projections, then one with a closest depth (e.g., z-buffer) may be selected. In some embodiments, bi-linear interpolation for RGB and depth may be used.

In various embodiments, depth cleanup 330 may handle various occlusions. Occlusions may be detected in order to assign zero data weights, in some embodiments, such that the occlusions are not rendered. For example, a main camera may have a view of an area that is a secondary view occlusion, for a secondary camera. In some scenarios, an occlusion may be likely to occur if a 3D triangle is aligned with all generative rays. Therefore, a dot product between rays and face normal may be computed. False occlusions can be created by the stretch of implicit mesh, in some embodiments. In some embodiments, false occlusions may need to be detected as part of depth cleanup 330 so that portions of image data that do need to be visible are not excluded as an occlusion. When an implicit reprojected surface is created, a false occlusion may occur as a stretched mesh may block a portion of the background expected to be visible when reprojecting a secondary camera to a main camera. Confidence values may be used to handle such scenarios by removing triangles when the confidence value is near some threshold amount (e.g., ~1).

In some scenarios, occlusions can occur when a foreground object is not within a field of view of a secondary camera. For example, a foreground object in the field of view of a main camera may create an expected main view occlusion of a background. The expected occlusion, however, is within the field of view of a secondary camera. If such an occlusion were not handled, the background would be rendered instead of the foreground object, when projecting from the secondary camera to the main camera. Techniques for handling such an exclusion may be explained. For instance, for a given ray, all candidates points may be sorted by decreasing depth. For a given depth, a test may be made as to whether there exists a point with closer depth that would project outside the FOV of the camera with the farthest depth. If the test does identify such a point that would project outside the FOV of the camera with the first depth, the farthest point is unlikely to be well constrained and should not be included, in some embodiments.

Figure 4A:
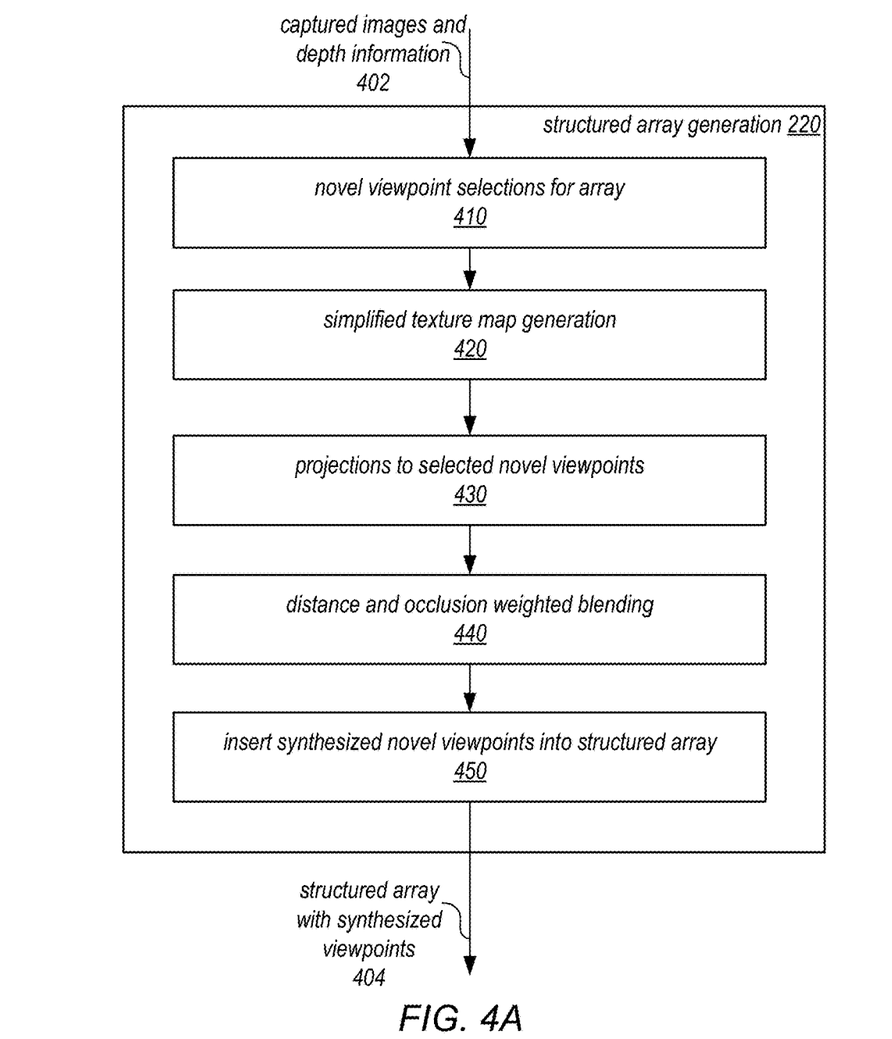
FIG. 4A illustrates a logical block diagram of structured array generation, according to some embodiments.
Figure 4B:
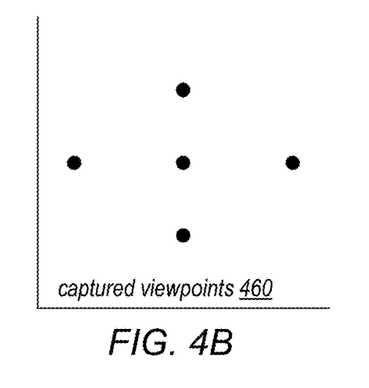
FIGS. 4B-4C illustrate structured arrays of viewpoints, according to some embodiments.
Figure 4C:
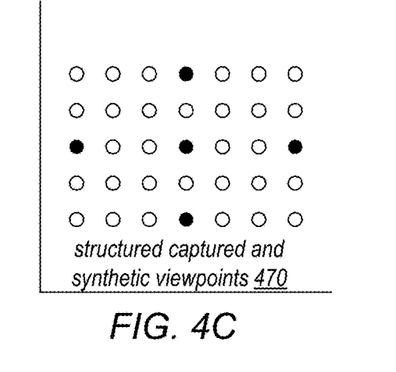

Turning back to FIG. 2, once depth information (e.g., depth maps) is created that correspond to received scene images, as indicated at 206 (or provided with scene images as indicated at 204) structured array generation 230 may generate a structured array of captured and synthesized viewpoints 208. FIG. 4A illustrates a logical block diagram of structured array generation, according to some embodiments. Scene images may, or may not be structured. For example, if a device with a single camera is used to capture images, then the scene images may not be located in a structured fashion for the scene. In such embodiments, one or more images may be selected to include in a structured viewpoint, whereas unselected images may be used to generate synthetic viewpoints to include in array. For example, in FIG. 4B, captured viewpoints 460 may be five different viewpoints which may be structured already as they were captured from structure locations on a device (e.g., on an HMD implementing a camera array). Thus, all of the captured viewpoints in the example 460 may be included in the structured and captured synthetic viewpoints 470.

As indicated at 402, captured images and depth information for a scene may be provided to structured array generation 220. Novel viewpoint selection for array 410 may determine which synthetic viewpoints to create and include in the structured array. For example, different shapes of array may be generated, such as planes, cubes, or spheres, different locations on which may be selected for creating different synthetic viewpoints to use in combination with any captured viewpoints that are also included, in some embodiments. In some embodiments, the structure of the generated array may be selected according to various display settings or other features indicated via a user interface (e.g., via the selection of one or more effect settings). As many different novel viewpoints may be selected at 410 as are needed to complete the array structured (e.g., if 5 viewpoints are included in from a capture device, then 20 more viewpoints may be created in order to complete a 5×5 structured array), in some embodiments.

As indicated at 420, simplified texture map generation may be applied using depth information (e.g., depth maps) for captured images. For example, a number of vertices, and thus a number of triangles that would be generated for an individual depth map may be reduced to be at or below some threshold amount (e.g., using approximately 20,000 triangles instead of 4 million triangles). In some embodiments, each triangle in the simplified mesh may be assigned a probability of occlusion, as discussed above.

As indicated at 420, projections may be performed to selected viewpoints, in some embodiments. For example, each image may be forward projected (e.g., warped) according to the projection techniques discussed above (e.g., using a 2-pass rendering from mesh), in some embodiments. An RBGD stack and an occlusion probability stack may be performed. As discussed above with regard to FIGS. 13-15, for out of view objects that cause transparency artifacts, an inter-view occlusion check may be performed, in some embodiments. Some modifications, such as removing triangles according to occlusion probability may be performed, in some embodiments.

As indicated at 440, distance and occlusion weighted blending may be performed, in some embodiments. For example, each pixel may be given a proximity weight that depends upon the convergence angle between a virtual pixel and a captured pixel. A final rendered synthetic viewpoint may be the weighted average of the warped images onto the synthetic viewpoint. Weights may be the proximity weights modulated by the occlusion weights. In this way, specularities may be preserved and depth accuracy constraints may be relaxed by giving more weight to closer rays. Additional for moving objects, the blending techniques may produce a graceful failure, akin to motion blur.

Figure 5:
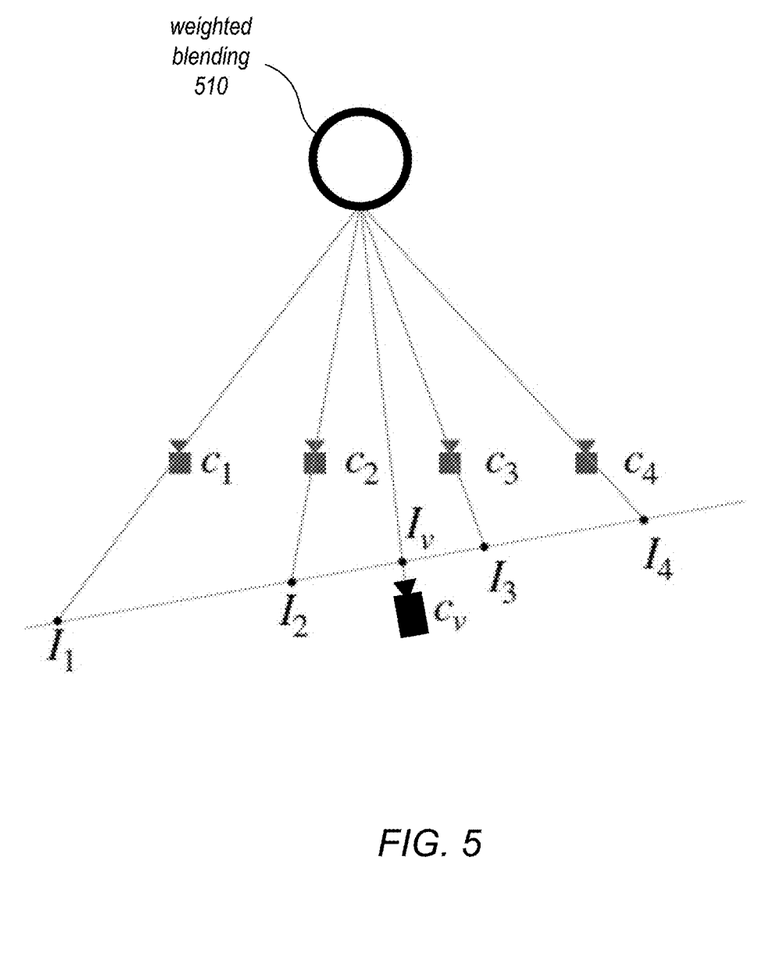
FIG. 5 illustrates features that describe weighted blending, according to some embodiments.

FIG. 5 illustrates features that describe weighted blending, according to some embodiments. Weighted blending 510 may be described as:

$$w_i(x, y) = w_{distance,i}(x, y) \cdot w_{occlusion,i}(x, y)$$

$$w_{distance,i}(x, y) = \frac{1}{\|I_i - I_v\|_2}$$

$$w_{occlusion,i}(x, y) = 1 - P_{occ}$$

As indicated at 450, synthesized novel viewpoints may be inserted into the structured array. For example, a data structure, file format, and/or other data arrangement may be used to store the structured array with synthesized viewpoints. The structured array with synthesized viewpoints 404 may be subsequently provided to a playback device for real-time processing 250.

Novel viewpoint generation 240 may receive a request or other indication of a scene viewpoint to generate in real-time. Novel viewpoint generation 240 may use the structured array of captured and synthesized viewpoints to produce a rendered scene viewpoint 224 according to the request. In various embodiments, novel viewpoint generation 240 may implement lightfield rendering techniques that use mapped frame buffers (e.g., instead of separate frame buffers per camera in an array).

Figure 6:
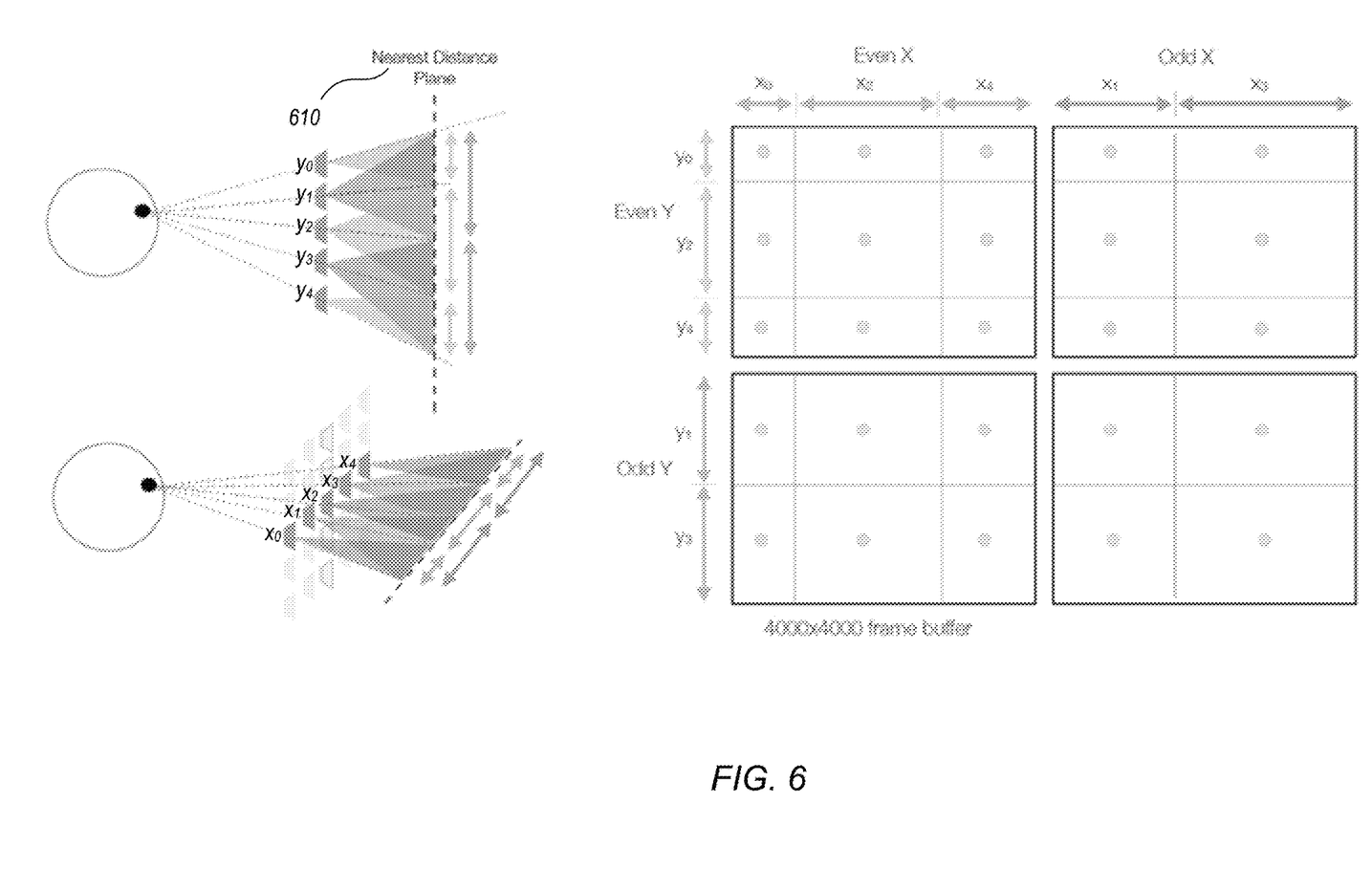
FIG. 6 illustrates blending for structured arrays with synthesized viewpoints for real-time rendering of a novel viewpoint, according to some embodiments.

For example, FIG. 6 illustrates blending for structured arrays with synthesized viewpoints for real-time rendering of a novel viewpoint, according to some embodiments. A nearest distance plane 610 is identified and used for blending. As depicted in FIG. 6, the camera views in the array along the identified axes, X and Y, may be mapped into the displayed frame. For instance, the even cameras, $y_0$, $y_2$, and $y_4$ may be mapped to three non-overlapping portions of the frame, whereas odd cameras $y_1$ and $y_3$ may be mapped to two non-overlapping portions of the frame (which do overlap with $y_0$, $y_2$, and $y_4$). A similar technique may be performed for cameras along the X axis, wherein $y_0$, $y_2$, and $y_4$ may be mapped to three non-overlapping portions of the frame, whereas odd cameras $x_1$ and $x_3$ may be mapped to two non-overlapping portions of the frame (which do overlap with $x_0$, $x_2$, and $x_4$).

Once mapped to the frame, the images from the structured array may be blended with the respective overlapping portions from the other mapped portions. In some embodiments, a linear blending technique may be used. In some embodiments, a gradient filter may be applied to eliminate artifacts such as stretches. A relaxed depth check may also be performed to preserve occlusion, in some embodiments.

A real environment refers to an environment that a person can perceive (e.g. see, hear, feel) without use of a device. For example, an office environment may include furniture such as desks, chairs, and filing cabinets; structural items such as doors, windows, and walls; and objects such as electronic devices, books, and writing instruments. A person in a real environment can perceive the various aspects of the environment, and may be able to interact with objects in the environment.

An extended reality (XR) environment, on the other hand, is partially or entirely simulated using an electronic device. In an XR environment, for example, a user may see or hear computer generated content that partially or wholly replaces the user's perception of the real environment. Additionally, a user can interact with an XR environment. For example, the user's movements can be tracked and virtual objects in the XR environment can change in response to the user's movements. As a further example, a device presenting an XR environment to a user may determine that a user is moving their hand toward the virtual position of a virtual object, and may move the virtual object in response. Additionally, a user's head position and/or eye gaze can be tracked and virtual objects can move to stay in the user's line of sight.

Examples of XR include augmented reality (AR), virtual reality (VR) and mixed reality (MR). XR can be considered along a spectrum of realities, where VR, on one end, completely immerses the user, replacing the real environment with virtual content, and on the other end, the user experiences the real environment unaided by a device. In between are AR and MR, which mix virtual content with the real environment.

VR generally refers to a type of XR that completely immerses a user and replaces the user's real environment. For example, VR can be presented to a user using a head mounted device (HMD), which can include a near-eye display to present a virtual visual environment to the user and headphones to present a virtual audible environment. In a VR environment, the movement of the user can be tracked and cause the user's view of the environment to change. For example, a user wearing a HMD can walk in the real environment and the user will appear to be walking through the virtual environment they are experiencing. Additionally, the user may be represented by an avatar in the virtual environment, and the user's movements can be tracked by the HMD using various sensors to animate the user's avatar.

AR and MR refer to a type of XR that includes some mixture of the real environment and virtual content. For example, a user may hold a tablet that includes a camera that captures images of the user's real environment. The tablet may have a display that displays the images of the real environment mixed with images of virtual objects. AR or MR can also be presented to a user through an HMD. An HMD can have an opaque display, or can use a see-through display, which allows the user to see the real environment through the display, while displaying virtual content overlaid on the real environment.

There are many types of devices that allow a user to experience the various forms of XR. Examples include HMDs, heads up displays (HUDs), projector-based systems, smart windows, tablets, desktop or laptop computers, smart watches, earbuds/headphones, controllers that may include haptic devices, and many others. As mentioned above, an HMD, or any of the other devices listed above may include opaque displays (e.g. liquid crystal displays (LCDs), organic light emitting diode (OLED) displays or micro-LED displays) or see through displays. A see through display can have a medium through which light is directed to a user's eyes. The medium can include one or more of a waveguide, hologram medium, optical combiner, optical reflector and other optical components. An image can be generated and propagated through the medium using a display source such as OLEDs, micro-LEDs, liquid crystal on silicon (LCOS), a light scanner, digital light projection (DLP).

Devices for XR may also include audio output devices such as speakers to present audio (including spatial audio) to users, haptics devices to stimulate the user's sense of touch, and other devices to stimulate any of the user's senses. Additionally, the device may include numerous sensors, including cameras, microphones, depth sensors, eye tracking sensors, environmental sensors, input sensors, and other sensors to allow the device to understand the user and the real environment.

Figure 7:
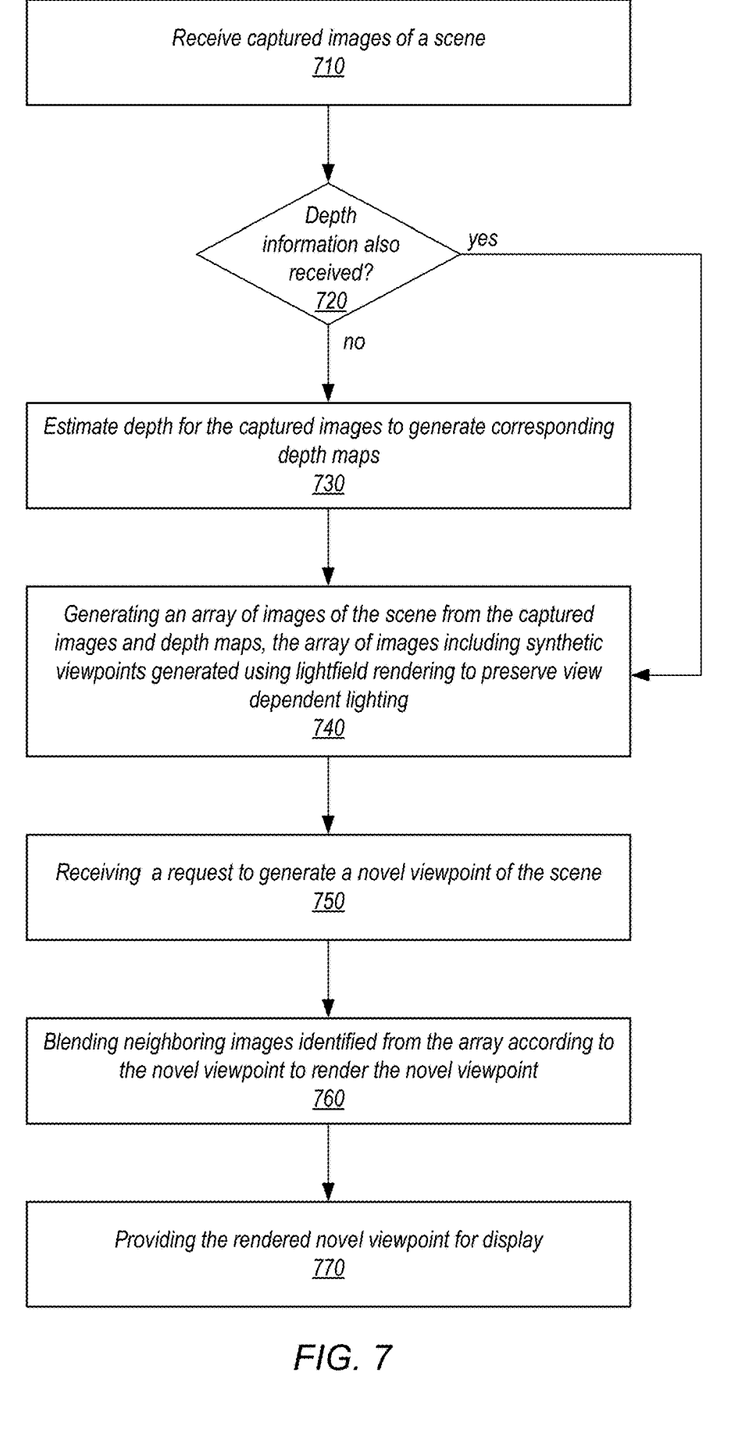
FIG. 7 illustrates a flowchart of a high-level method for generating and using synthesized camera arrays for rendering novel viewpoints, according to some embodiments.

FIG. 7 illustrates a flowchart of a high-level method for generating and using synthesized camera arrays for rendering novel viewpoints, according to some embodiments. As indicated at 710, captured images of a scene may be received, in some embodiments. Captured images may be captured by different types of cameras, in some embodiments (e.g., depth and RGB) or one type of camera. In some embodiments, the captured images may be from an array of cameras (e.g., on a wearable device like an HMD) or may be from single camera capturing different viewpoints of a scene over time (e.g., as still photos or as a video recording).

As indicated at 720, it may be determined whether depth information (e.g., depth maps) are included with the captured images (e.g., RGB images). If not, then, as indicated at 730, depth may be estimated for the captured images to generate corresponding depth maps, in various embodiments. For example, the various techniques discussed above with regard to FIGS. 3-15 may be used in varying combinations to extract and provide depth maps that correspond to the captured images.

As indicated at 740, an array of images of the scene may be generated from the captured images and depth maps, the array of images including synthetic viewpoints generated using lightfield rendering to preserve view dependent lighting, in some embodiments. For example, simplified texture map generation, projections to synthesized viewpoints, and distance and occlusion weighted blending may be performed, according to the techniques discussed above with regard to FIG. 4A, in order to generate the array of images.

As indicated at 750, a request may be received to generate a novel viewpoint of the scene, in some embodiments. The request may be received via various types of interface, including touch-based, gesture-based, motion-based, or various other I/O devices (e.g., keyboards or other buttons, mice, etc.). As indicated at 760, neighboring images identified from the array according to the novel viewpoint may be blended to render the novel viewpoint, in some embodiments. For example, as discussed above with regard to FIG. 18, different images in the array are mapped to different respective portions of the image frame (some of which may overlap) and then rendered using efficient rendering techniques like linear blending according to the mappings. As indicated at 770, the rendered novel viewpoint may be provided for display, in some embodiments. For example, a playback device may render the novel viewpoint and display the rendered novel viewpoint on attached display(s).

Figure 8:
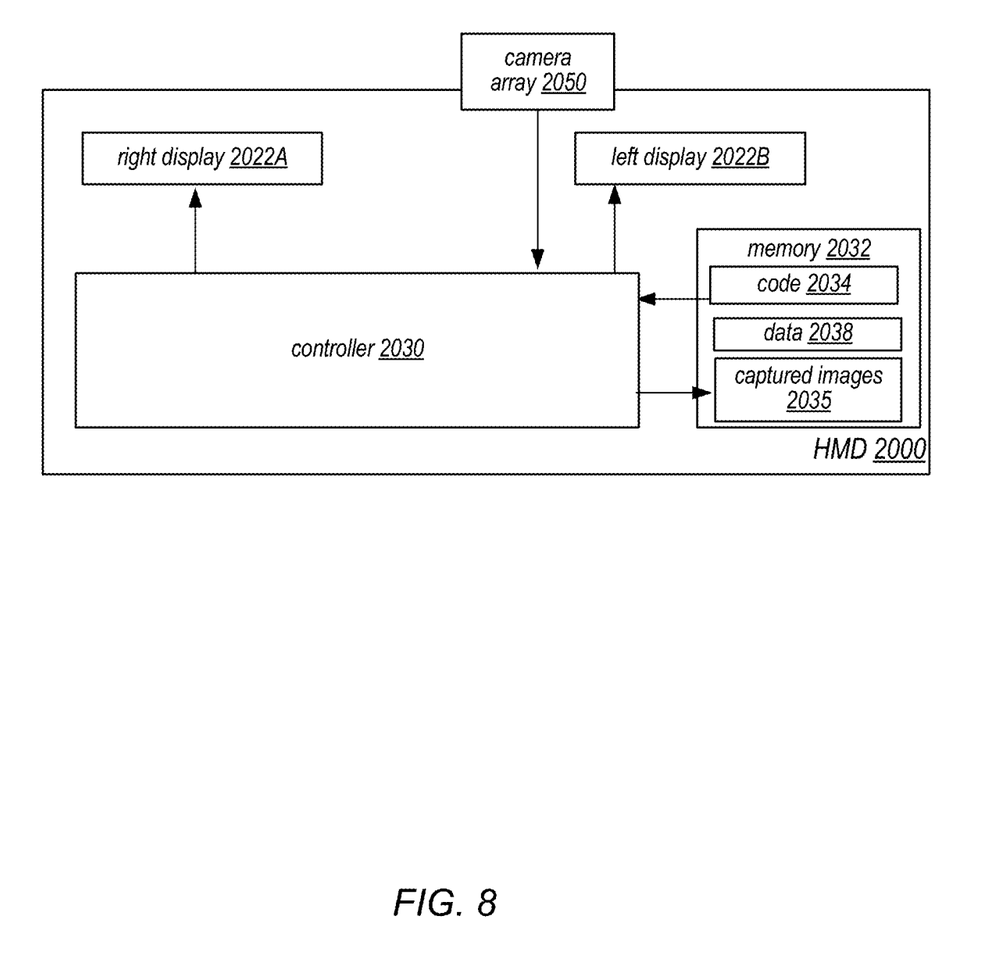
FIG. 8 illustrates an example head mounted display (HMD), according to some embodiments.

FIG. 8 illustrates an example head mounted display (HMD), according to some embodiments. In some embodiments, HMD 2000 may be a headset, helmet, goggles, or glasses. HMD 2000 may implement any of various types of display technologies. For example, HMD 2000 may include a near-eye display system that displays left and right images on opaque display screens 2022A and 2022B in front of the user's eyes that are viewed by the user. As another example, rather than an opaque display, an HMD may include transparent or translucent displays 2022A and 2022B (e.g., eyeglass lenses) through which the user may view the real environment and a medium integrated with displays 2022A and 2022B through which light representative of virtual images is directed to the user's eyes to provide an augmented view of reality to the user.

In some embodiments, HMD 2000 may include a controller 2030 configured to implement functionality of the HMD system and to generate frames (each frame including a left and right image) that are provided to displays 2022A and 2022B, such as the frames for a requested novel viewpoint of a scene. In some embodiments, HMD 2000 may also include memory 2032 configured to store software (code 2034) that is executable by the controller 2030, as well as data 2038 that may be used by HMD 2000 when executing on the controller 2030. For example code 2034 may include instructions to perform various stages (or all of) rendering pipeline 210 discussed above with regard to FIG. 2. In some embodiments, memory 2032 may also be used to store captured images 2035, and/or other information captured by camera array 2050, such as depth information, structured arrays with synthesized viewpoints, and/or generated novel viewpoints. In some embodiments, HMD 2000 may also include one or more interfaces (e.g., a Bluetooth technology interface, USB interface, etc.) configured to communicate with an external device 2090 via a wired or wireless connection. In some embodiments, at least a part of the functionality described for the controller 2030 may be implemented by the external device 2090. External device 2090 may be or may include any type of computing system or computing device, such as a desktop computer, notebook or laptop computer, pad or tablet device, smartphone, hand-held computing device, game controller, game system, and so on.

In various embodiments, controller 2030 may be a uni-processor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include one or more sensors (not shown) that collect information about the user's environment (video, depth information, lighting information, etc.). The sensors may provide the information to the controller 2030 of HMD 2000. In some embodiments, the sensors may include, but are not limited to, at least one visible light camera 2050 (e.g., an RGB video camera) and ambient light sensors.

In some embodiments, the HMD 2000 may be configured to render and display frames to provide an augmented or mixed reality (MR) view for the user based at least in part according to sensor inputs. The MR view may include renderings of the user's environment, including renderings of real objects in the user's environment, based on video captured by one or more video cameras 2050 that capture high-quality, high-resolution video of the user's environment for display. The MR view may also include virtual content (e.g., virtual objects, virtual tags for real objects, avatars of the user, etc.) generated by HMD 2000 and composited with the displayed view of the user's real environment. The HMD 2000 may include recording functionality that allows the user to record images or video of the real environment captured by the HMD camera array 2050.

Figure 9:
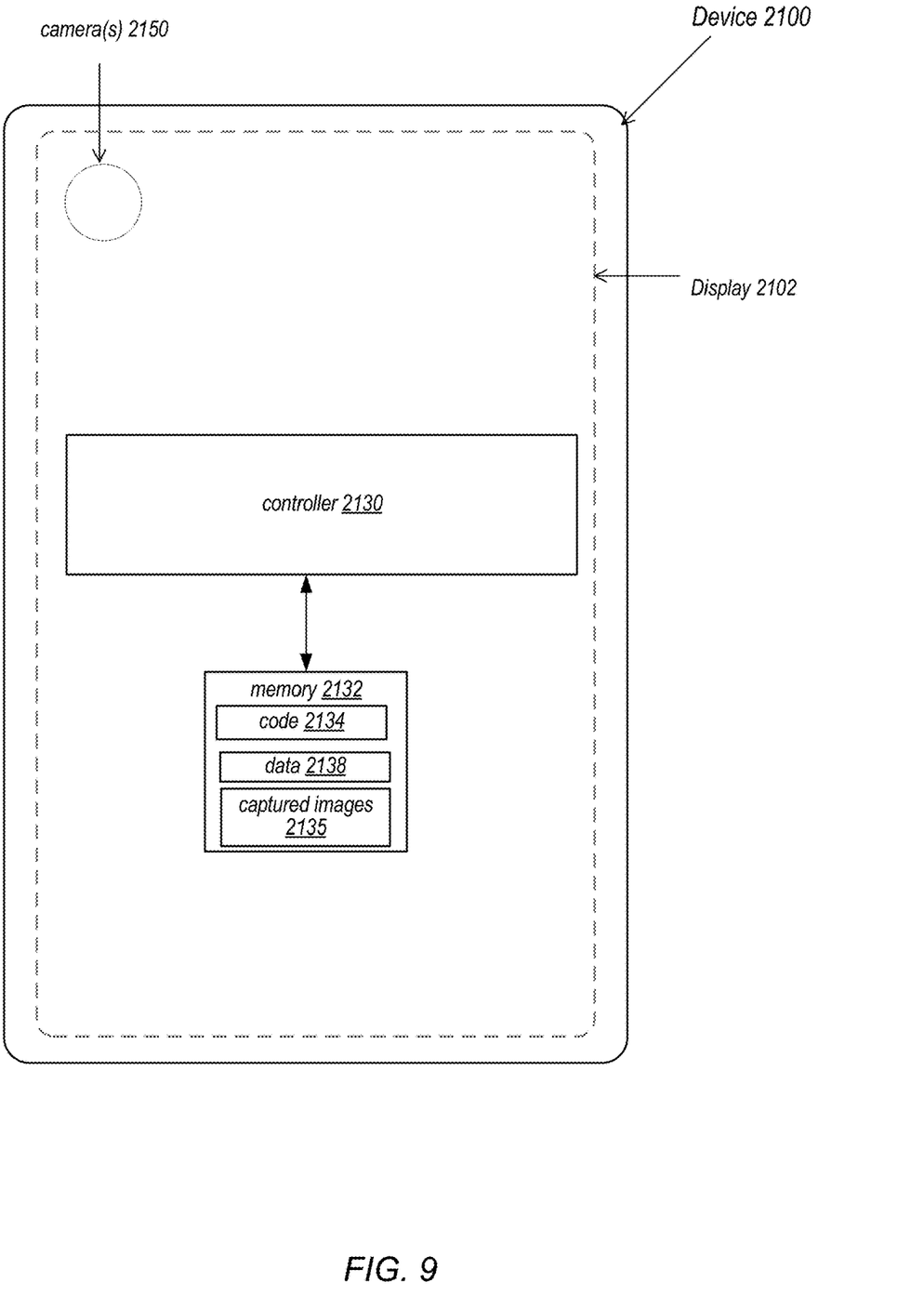
FIG. 9 illustrates an example mobile device, according to some embodiments.

Other types of devices may participate in capturing, rendering, and/or displaying viewpoints of a scene FIG. 9 illustrates an example mobile device, according to some embodiments. Device 2100 may be a tablet, mobile phone, laptop, computing pad, or other mobile computing device (although desktop, servers, or other non-mobile computing devices may also implement rendering techniques and include similar features to perform the receipt, processing, and providing of requested viewpoints for display). Device 2100 include a controller 2130 configured to implement functionality of device 2100 and to generate image data that is provided to display 2102, such as the frames for a requested novel viewpoint of a scene. In some embodiments, device 2100 may also include memory 2132 configured to store software (code 2134) that is executable by the controller 2130, as well as data 2138 that may be used by device 2100 when executing on the controller 2130. For example code 2134 may include instructions to perform various stages (or all of) rendering pipeline 210 discussed above with regard to FIG. 2. In some embodiments, memory 2132 may also be used to store captured images 2135, and/or other information captured by camera(s) 2150, such as depth information, structured arrays with synthesized viewpoints, and/or generated novel viewpoints. In some embodiments, device 2100 may also include one or more interfaces (e.g., a Bluetooth technology interface, USB interface, etc.) configured to communicate with an external device via a wired or wireless connection. In some embodiments, at least a part of the functionality described for the controller 2130 may be implemented by the external device. External device may be or may include any type of computing system or computing device, such as a desktop computer, notebook or laptop computer, pad or tablet device, smartphone, hand-held computing device, game controller, game system, and so on.

In various embodiments, controller 2130 may be a uni-processor system including one processor, or a multiprocessor system including several processors (e.g., two, four, eight, or another suitable number). Controller 2130 may include central processing units (CPUs) configured to implement any suitable instruction set architecture, and may be configured to execute instructions defined in that instruction set architecture. For example, in various embodiments controller 2130 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2130 may employ any microarchitecture, including scalar, superscalar, pipelined, superpipelined, out of order, in order, speculative, non-speculative, etc., or combinations thereof. Controller 2130 may include circuitry to implement microcoding techniques. Controller 2130 may include one or more processing cores each configured to execute instructions. Controller 2130 may include one or more levels of caches, which may employ any size and any configuration (set associative, direct mapped, etc.). In some embodiments, controller 2130 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2130 may include one or more other components for processing and rendering video and/or images, for example image signal processors (ISPs), coder/decoders (codecs), etc.

Memory 2132 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   one or more display devices;
   a controller; and
   a memory, storing program instructions that when executed by the controller, cause the controller to:
   obtain an array of images of a scene comprising a plurality of synthetic viewpoints generated from a plurality of captured viewpoints of the scene and added to the array of images to complete the array of images of the scene, wherein the synthetic viewpoints are generated using lightfield rendering to preserve view dependent lighting;
   receive a request to generate a novel viewpoint of the scene;
   render the novel viewpoint according to weighted averages generated from neighboring images identified in the array of images according to the novel viewpoint and mapped to corresponding portions of a frame for displaying the novel viewpoint; and
   display the rendered, novel viewpoint via the one or more display devices.

2. The apparatus of claim 1, further comprising one or more image sensors and wherein the memory stores further program instructions that when executed by the controller further cause the controller to:
   obtain the plurality of captured viewpoints of the scene via the one or more image sensors; and
   generate the array of images of the scene from the plurality of captured viewpoints and corresponding depth maps for the captured plurality of viewpoints to include the plurality of synthetic viewpoints in the array.

3. The apparatus of claim 2, wherein the memory stores further program instructions that when executed by the controller further cause the controller to estimate depth information based on the plurality of captured viewpoints to generate the respective depth maps corresponding to the plurality of captured viewpoints.

4. The apparatus of claim 2, wherein the apparatus is a head mounted display (HMD) and wherein the one or more images sensors are a camera array.

5. The apparatus of claim 2, wherein the array is generated in a two-dimensional structure.

6. The apparatus of claim 1, wherein to generate the array of images of the scene, the program instructions cause the controller to:
   perform projections from the captured plurality of viewpoints to the plurality of synthetic viewpoints according to respective simplified texture maps generated for the captured plurality of viewpoints; and
   perform a weighted blending of distance weights and occlusion weights to respectively generate the plurality of synthetic viewpoints.

7. The apparatus of claim 1, wherein the memory stores further program instructions that when executed by the controller further cause the controller to send the array of images of the scene to a playback device.

8. A method, comprising:
   obtaining an array of images of a scene comprising a plurality of synthetic viewpoints generated from a plurality of captured viewpoints of the scene, wherein the synthetic viewpoints are generated using lightfield rendering to preserve view dependent lighting and added to the array of images to complete the array of images of the scene;
   receiving a request to generate a novel viewpoint of the scene;
   blending neighboring ones of the images identified from the array of images according to the novel viewpoint to render the novel viewpoint; and
   providing the rendered novel viewpoint for display.

9. The method of claim 8, further comprising:
   receiving the plurality of captured viewpoints of the scene; and
   generating the array of images of the scene from the plurality of captured viewpoints and corresponding depth maps for the captured plurality of viewpoints to include the plurality of synthetic viewpoints in the array.

10. The method of claim 9, wherein the array is generated in a three-dimensional structure.

11. The method of claim 9, wherein generating the array of images of the scene from the plurality of captured viewpoints and corresponding depth maps for the captured plurality of viewpoints to include the plurality of synthetic viewpoints in the array comprises:
   performing projections from the captured plurality of viewpoints to the plurality of synthetic viewpoints according to respective simplified texture maps generated for the captured plurality of viewpoints; and
   performing a weighted blending of distance weights and occlusion weights to respectively generate the plurality of synthetic viewpoints.

12. The method of claim 9, further comprising estimating depth information based on the plurality of captured viewpoints to generate the respective depth maps corresponding to the plurality of captured viewpoints.

13. The method of claim 9, further comprising selecting the plurality of captured viewpoints out of a larger set of captured viewpoints before generating the array of images.

14. The method of claim 8, wherein the method is performed by a playback device that received the array of images of the scene from a capture device via a wireless communication.

15. A device, comprising:
   one or more images sensor;
   a controller for the device; and
   a memory, storing program instructions that when executed by the controller for the device, cause the device to:
      generate an array of images of a scene from a plurality of captured viewpoints captured via the one or more image sensors and corresponding depth maps for the captured plurality of viewpoints to include a plurality of synthetic viewpoints in the array of images using lightfield rendering to preserve view dependent lighting to complete the array of images of the scene;
      receive a request to generate a novel viewpoint of the scene;
      blend neighboring ones of the images identified from the array of images according to the novel viewpoint to render the novel viewpoint; and
      provide the rendered novel viewpoint for display.

16. The device of claim 15, wherein to generate the array of images, the program instructions cause the controller to:
   perform projections from the captured plurality of viewpoints to the plurality of synthetic viewpoints according to respective simplified texture maps generated for the captured plurality of viewpoints; and
   perform a weighted blending of distance weights and occlusion weights to respectively generate the plurality of synthetic viewpoints.

17. The device of claim 15, wherein the memory stores further instructions that when executed by the controller, cause the controller to estimate depth information based on the plurality of captured viewpoints to generate the respective depth maps corresponding to the plurality of captured viewpoints.

18. The device of claim 15, wherein to generate the array of images, the program instructions cause the controller to remove one or more triangles of the simplified texture maps according to a probability of occlusion determined for the one or more triangles.

19. The device of claim 15, wherein the corresponding depth maps are generated based, at least in part, on depth information captured via the one or more image sensors.

20. The device of claim 15, wherein the device is a mobile device that captured the plurality of captured viewpoints of the scene via a single one of the one or more image sensors.

* * * * *